United States Patent
Nonaka et al.

(10) Patent No.: US 9,878,942 B2
(45) Date of Patent: Jan. 30, 2018

(54) GLASS COMPOSITION FOR GLASS FIBER

(71) Applicant: NITTO BOSEKI CO., LTD., Fukushima-shi, Fukushima (JP)

(72) Inventors: Takashi Nonaka, Fukushima (JP); Norio Hirayama, Fukushima (JP); Kazuaki Minami, Fukushima (JP); Yosuke Nukui, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 15/318,574

(22) PCT Filed: Dec. 18, 2015

(86) PCT No.: PCT/JP2015/085442
§ 371 (c)(1),
(2) Date: Dec. 13, 2016

(87) PCT Pub. No.: WO2016/203676
PCT Pub. Date: Dec. 22, 2016

(65) Prior Publication Data
US 2017/0226003 A1    Aug. 10, 2017

(30) Foreign Application Priority Data

Aug. 21, 2015 (WO) .................. PCT/JP2015/073632

(51) Int. Cl.
*C03C 13/00* (2006.01)
*C03C 3/087* (2006.01)

(52) U.S. Cl.
CPC .............. *C03C 13/00* (2013.01); *C03C 3/087* (2013.01); *C03C 2213/00* (2013.01)

(58) Field of Classification Search
CPC .......... C03C 3/087; C03C 3/091; C03C 13/00
See application file for complete search history.

(56) References Cited

U.S. PATENT DOCUMENTS

| | | | |
|---|---|---|---|
| 4,046,948 A | 9/1977 | Zlochower | |
| 8,987,154 B2 | 3/2015 | Hofmann et al. | |
| 9,227,870 B2 | 1/2016 | Nonaka et al. | |
| 2007/0087139 A1 | 4/2007 | Creux et al. | |
| 2009/0286440 A1* | 11/2009 | Lecomte | C03C 3/087 442/181 |
| 2012/0095149 A1* | 4/2012 | Sawanoi | H05K 1/0366 524/494 |
| 2012/0135849 A1* | 5/2012 | Hoffman | C03C 3/087 501/38 |
| 2016/0176754 A1 | 6/2016 | Lecomte et al. | |

FOREIGN PATENT DOCUMENTS

| | | |
|---|---|---|
| EP | 2 354 104 A1 | 8/2011 |
| JP | 2006-527158 | 11/2006 |
| JP | 2008-524100 A | 7/2008 |
| JP | 2013-500939 A | 1/2013 |
| WO | 2011-095598 A1 | 8/2011 |
| WO | 2011/155362 A1 | 12/2011 |
| WO | 2014/208522 A1 | 12/2014 |

OTHER PUBLICATIONS

Extended European search report dated Feb. 21, 2017 issued in the counterpart EP Patent Application 15895143.4.

\* cited by examiner

*Primary Examiner* — Elizabeth A. Bolden
(74) *Attorney, Agent, or Firm* — Carrier Blackman & Associates, P.C.; Joseph P. Carrier; Fulchand P. Shende

(57) ABSTRACT

Provided is a glass composition for glass fiber allowing spinning to be stably performed without mixing of red foreign substances into glass fibers. The glass composition for glass fiber includes, in relation to the total amount thereof, $SiO_2$ in a content falling within a range from 57.0 to 60.0% by mass, $Al_2O_3$ in a content falling within a range from 17.5 to 20.0% by mass, MgO in a content falling within a range from 8.5 to 12.0% by mass, CaO in a content falling within a range from 10.0 to 13.0% by mass and $B_2O_3$ in a content falling within a range from 0.5 to 1.5% by mass, the total content of $SiO_2$, $Al_2O_3$, MgO and CaO being 98.0% by mass or more.

11 Claims, 8 Drawing Sheets

Example 1 (B₂O₃: 0.5% by mass)

500μm

Example 2 (B₂O₃: 1.0% by mass)

500μm

Example 3 (B₂O₃: 1.5% by mass)

500μm

Comparative Example 1 (B₂O₃: absent)

500μm

Comparative Example 2 (B₂O₃: 0.3% by mass)

500μm

Comparative Example 3 (B₂O₃: 2.0% by mass)

500μm

Example 4 (B₂O₃: 0.5% by mass)

Example 5 (B₂O₃: 1.0% by mass)

Example 6 (B₂O₃: 1.5% by mass)

Example 7 (B₂O₃: 1.0% by mass)

Comparative Example 4 (B₂O₃: absent)

Example 8 (B₂O₃: 0.5% by mass)

Example 9 (B₂O₃: 1.0% by mass)

Example 10 (B₂O₃: 1.5% by mass)

Comparative Example 5 (B₂O₃: absent)

Comparative Example 6 (B₂O₃: 1.0% by mass)

500μm

Comparative Example 7 (B₂O₃: 1.0% by mass)

500μm

Comparative Example 8 (B₂O₃: 1.0% by mass)

500μm

Comparative Example 9 (B₂O₃: 1.0% by mass)
500μm

Comparative Example 10 (B₂O₃: 1.0% by mass)
500μm

Comparative Example 11 (B₂O₃: 1.0% by mass)
500μm

Comparative Example 12 ($B_2O_3$: 1.0% by mass)

500μm

GLASS COMPOSITION FOR GLASS FIBER

TECHNICAL FIELD

The present invention relates to a glass composition for glass fiber.

BACKGROUND ART

Glass fibers are produced as follows: glass raw materials mixed so as to give a glass composition having a desired composition were melted in a melting furnace to prepare molten glass (melt of glass composition), the molten glass is discharged from a vessel having a nozzle plate in which tens to thousands of nozzle tips are formed (called "bushing"), the discharged molten glass is taken up at a high speed and thus cooled while being stretched, and thus solidified into fiber shapes (hereinafter, this operation is sometimes referred to as "spinning"). The bushing is formed of, for example, a noble metal such as platinum.

As a glass for forming the glass fiber, there has hitherto been known a glass having a composition composed of $SiO_2$, $Al_2O_3$ and MgO (S-glass). According to S-glass, glass fibers having high fiber strength and high fiber modulus of elasticity can be obtained as compared with general-purpose glass such as E-glass; however S-glass is problematic in that the spinning of glass fiber is not necessarily easy in view of the 1000-poise temperature and the liquidus temperature.

The 1000-poise temperature as referred to herein means the temperature at which the viscosity of the molten glass comes to be 1000 poises (100 Pa·s), and the liquidus temperature as referred to herein means the temperature at which crystals start to precipitate while the temperature of the molten glass is being lowered. In general, glass fibers can be efficiently spun when the viscosity of the molten glass is allowed to be in the vicinity of 1000 poises. Accordingly, usually the wider the temperature range between the 1000-poise temperature and the liquidus temperature (working temperature range), the more easily and the more stably the spinning of glass fibers can be performed.

In S-glass, the 1000-poise temperature and the liquidus temperature are extremely close to each other, and the working temperature range is narrow; accordingly, molten S-glass tends to undergo crystallization (devitrification) even under the effect of slight temperature decrease. Accordingly, in order to stably perform the spinning of S-glass, it is necessary to accurately control the spinning conditions in the production process of glass fibers.

Thus, as a glass composition for glass fiber, produced more easily than S-glass and having a higher fiber strength and a higher fiber modulus of elasticity than the general-purpose glass, the present applicant has proposed a glass composition having the composition in which, in relation to the total amount of the glass composition, the content of $SiO_2$ is 57.0 to 63.0% by mass, the content of $Al_2O_3$ is 19.0 to 23.0% by mass, the content of MgO is 10.0 to 15.0% by mass, the content of CaO is 4.0 to 11.0% by mass, and the sum content of $SiO_2$, $Al_2O_3$, MgO and CaO is 99.5% by mass or more (see Patent Literature 1).

According to the glass composition described in Patent Literature 1, the 1000-poise temperature and the liquidus temperature can be lowered, and it is possible to easily produce glass fibers having a higher fiber strength and a higher fiber modulus of elasticity than the general-purpose glass, by spinning the molten glass prepared by melting the glass raw materials mixed so as to give the glass composition having the composition falling within the foregoing ranges.

In the spinning of the molten glass prepared by melting the glass raw materials mixed so as to give the glass composition having the composition falling within the range described in Patent Literature 1, a bushing provided with circular nozzle tips is usually used, and the bushing is set at a temperature higher than the liquidus temperature of the molten glass. In this way, the molten glass discharged from the circular nozzle tips has a strong effect to become round due to the surface tension of itself, and thus it is possible to easily obtain glass fibers having cross sectional shapes close to a perfect circle. When the viscosity of the molten glass is 200 poises (20 Pa·s) or less, the glass discharged from the nozzle tips takes droplet shapes without forming fibers. Accordingly, the bushing is controlled at a temperature equal to or lower than the temperature at which the viscosity of the molten glass is 200 poises.

When glass fibers having non-circular cross sections such as flat shaped glass fibers are obtained, a bushing provided with flat-shaped nozzle tips is used. When a molten glass is spun at a viscosity of 1000 poises or less, the viscosity of the glass discharged from the nozzle tips is too low, and the discharged glass becomes round due to the surface tension of itself so as to make it difficult to obtain glass fibers having non-circular cross sections. Accordingly, a bushing provided with flat-shaped nozzle tips is controlled at a temperature which is higher than the liquidus temperature of the molten glass and at which the viscosity of the molten glass is 1000 poises or more. In this way, the viscosity of the molten glass discharged from the flat-shaped nozzle tips is heightened, the surface tension of the molten glass itself is made difficult to function, and thus it is made possible to obtain glass fibers having non-circular cross sections such as flat shaped glass fibers in accordance with the shapes of the openings of the nozzle tips.

CITATION LIST

Patent Literature

Patent Literature 1
  International Publication No. WO 2011/155362

SUMMARY OF INVENTION

Technical Problem

However, there is an inconvenience that the spinning of the molten glass prepared by melting the glass raw materials mixed so as to give the glass composition having the composition falling within the range described in Patent Literature 1 causes the mixing of red crystals in the obtained glass fibers, spun fiber breakage occurs frequently, and the productivity degradation is infrequently caused.

An object of the present invention is to provide, by solving such an inconvenience, a glass composition for glass fiber, allowing glass fibers to be stably spun without causing mixing of red crystals in the glass fibers and being provided with a higher fiber strength and a higher fiber modulus of elasticity than the general-purpose glass (E-glass).

Solution to Problem

The present inventors made a diligent study on the causes and the conditions for the mixing of red crystals in the obtained glass fibers in the spinning of the molten glass prepared by melting the glass raw materials mixed so as to give the glass composition having the composition falling within the range described in Patent Literature 1.

Consequently, the present inventors have discovered that the red crystals infrequently occur during the production of glass fibers having non-circular cross sections such as flat shaped glass fibers s or glass fibers having perfect circular cross sections of 3 μm or more and less than 10 μm in fiber diameter, by discharging, from the nozzle chips of the bushing, the molten glass as the glass composition, which is obtained by melting the glass raw materials in a large size furnace having a monthly production capacity of a few hundred tons or more.

The present inventors have discovered that in the case of the production of glass fibers having non-circular cross sections such as flat shaped glass fibers, red crystals are generated when the temperature decrease occurs at the ends inside the bushing or in the vicinity of the nozzle chips, due to the breakage of spun fibers or the temperature variation of the external environment.

The present inventors have also discovered that in the case of the production of glass fibers having perfect circular cross sections of 3 μm or more and less than 10 μm in fiber diameter, red crystals are generated when the temperature region lower than the controlled temperature occurs in the ends inside the bushing or the upper portion of the bushing because the amount of the molten glass flowing into the bushing is small, accordingly the heat brought into the bushing by the molten glass is decreased.

In the large size furnace, heating is performed by, for example, indirect flame heating using gas burners, and chromium oxide bricks, excellent in glass abrasion resistance at high temperatures, are used in the portion brought into contact with the molten glass. The red crystals are probably precipitated as follows: the Cr component contained in the chromium oxide bricks is eluted into the molten glass, and when the molten glass stagnates in the interior of the bushing or in the upper temperature-lowered portion of the bushing, the eluted Cr component and the components in the glass react with each other, and the Cr component is precipitated as spinel crystals composed of composite oxides of Cr, Mg and Al.

The present inventors made further investigations on the basis of the foregoing findings, and have reached the present invention by consequently discovering that the foregoing inconvenience can be solved by allowing the glass composition for glass fiber to include an additive capable of suppressing the generation of the red crystals, when glass fibers are produced by spinning the molten glass prepared by melting the glass raw materials mixed so as to give a specific glass composition for glass fiber.

Accordingly, in order to achieve the above-described object, the glass composition for glass fiber of the present invention includes, in relation to the total amount thereof, $SiO_2$ in a range from 57.0 to 60.0% by mass, $Al_2O_3$ in a range from 17.5 to 20.0% by mass, MgO in a range from 8.5 to 12.0% by mass, CaO in a range from 10.0 to 13.0% by mass and $B_2O_3$ in a range from 0.5 to 1.5% by mass; and the total amount of $SiO_2$, $Al_2O_3$, MgO and CaO is 98.0% by mass or more.

According to the glass composition for glass fiber of the present invention, $SiO_2$, $Al_2O_3$, MgO and CaO are included in the above-described ranges, and further $B_2O_3$ is included in the above-described range as the component capable of suppressing the generation of the red crystals; thus, the mixing of the red crystals in the obtained glass fibers can be prevented, and the production of glass fibers can be stably performed.

In addition, according to the glass composition for glass fiber of the present invention, by setting, in relation to the total amount thereof, the contents of $SiO_2$, $Al_2O_3$, MgO and CaO so as to fall within the above-described ranges, respectively, even when $B_2O_3$ is added in an amount within the above-described range, it is possible to produce glass fibers having a higher fiber strength and a higher fiber modulus of elasticity than the general-purpose glass (E-glass).

In the glass composition for glass fiber of the present invention, when the content of $B_2O_3$ is less than 0.5% by mass in relation to the total amount of the glass composition for glass fiber, it is impossible to prevent the mixing of the red crystals in the obtained glass fibers; and when the content of $B_2O_3$ exceeds 1.5% by mass in relation to the total amount of the glass composition for glass fiber, the physical properties such as the fiber strength and the fiber modulus of elasticity of the obtained glass fibers are impaired.

In the glass composition for glass fiber of the present invention, the content of $B_2O_3$ in relation to the total amount of the glass composition for glass fiber falls preferably within a range from 0.6 to 1.4% by mass, more preferably within a range from 0.7 to 1.3% by mass, further preferably within a range from 0.8 to 1.2% by mass and particularly preferably within a range from 0.9 to 1.1% by mass.

In the glass composition for glass fiber of the present invention, by setting the content of $B_2O_3$ in relation to the total amount of the glass composition for glass fiber so as to fall within such ranges, it is possible to obtain an effect to be able to suppress the precipitation of the red crystals while the high fiber modulus of elasticity is being maintained in the obtained glass fibers.

In the glass composition for glass fiber, when the content of $SiO_2$ in relation to the total amount of the glass composition for glass fiber is less than 57.0% by mass, it is impossible to improve the mechanical strength of the obtained glass fibers, and the obtained glass fibers are chemically unstable. On the other hand, in the glass composition for glass fiber, when the content of $SiO_2$ in relation to the total amount of the glass composition for glass fiber exceeds 60.0% by mass, the 1000-poise temperature and the liquidus temperature are heightened, and the production of glass fibers is made difficult.

In the glass composition for glass fiber, the content of $SiO_2$ in relation to the total amount of the glass composition for glass fiber is set to fall preferably within a range from 57.5 to 59.5% by mass, more preferably within a range from 58.0 to 59.3% by mass, further preferably within a range from 58.1 to 59.2% by mass, especially preferably within a range from 58.1 to 59.1% by mass, particularly preferably within a range from 58.2 to 59.0% by mass, specially preferably within a range from 58.3 to 59.0% by mass, extremely preferably within a range from 58.5 to 58.8% by mass and most preferably within a range from 58.6 to 58.8% by mass. In this way, the glass composition for glass fiber can obtain an effect to be able to maintain a wide working temperature range while the high fiber strength is being maintained.

In the glass composition for glass fiber, when the content of $Al_2O_3$ in relation to the total amount of the glass composition for glass fiber is less than 17.5% by mass, it is impossible to heighten the fiber modulus of elasticity of the obtained glass fibers, and when the content of $Al_2O_3$ in relation to the total amount of the glass composition for glass fiber exceeds 20.0% by mass, the liquidus temperature is heightened and accordingly the working temperature range is narrowed. When the content of $Al_2O_3$ exceeds 20.0% by mass, it is impossible to prevent the mixing of the red crystals into the obtained glass fibers.

In the glass composition for glass fiber, the content of $Al_2O_3$ in relation to the total amount of the glass composition for glass fiber is set to fall preferably within a range from 18.0 to 19.5% by mass, more preferably within a range from 18.1 to 19.4% by mass, further preferably within a range from 18.2 to 19.0% by mass and particularly preferably within a range from 18.3 to 18.9% by mass. In this way, the glass composition for glass fiber can obtain an effect to be able to suppress the precipitation of the red crystals while the high fiber modulus of elasticity is being maintained.

In the glass composition for glass fiber, when the content of MgO in relation to the total amount of the glass composition for glass fiber is less than 8.5% by mass, it is impossible to heighten the fiber modulus of elasticity of the obtained glass fibers, and when the content of MgO in relation to the total amount of the glass composition for glass fiber exceeds 12.0% by mass, the liquidus temperature is heightened, and accordingly the working temperature range is narrowed.

In the glass composition for glass fiber, the content of MgO in relation to the total amount of the glass composition for glass fiber is set to fall preferably within a range from 8.8 to 11.5% by mass, more preferably within a range from 8.9 to 11.4% by mass, further preferably within a range from 9.0 to 11.0% by mass, particularly preferably within a range from 9.0 to 10.9% by mass and most preferably within a range from 9.0 to 9.9% by mass. In this way, the glass composition for glass fiber can obtain an effect to be able to maintain a wide working temperature range while the high fiber modulus of elasticity is being maintained.

In the glass composition for glass fiber, when the content of CaO in relation to the total amount of the glass composition for glass fiber is less than 10.0% by mass, the liquidus temperature is heightened, accordingly the working temperature range is narrowed, and it is impossible to prevent the mixing of the red crystals into the obtained glass fibers. When the content of CaO exceeds 13.0% by mass, it is impossible to heighten the fiber modulus of elasticity of the obtained glass fibers, and the linear expansion coefficient of the glass fiber is enlarged.

In the glass composition for glass fiber, the content of CaO in relation to the total amount of the glass composition for glass fiber is set to fall preferably within a range from 10.3 to 12.5% by mass, more preferably within a range from 10.4 to 12.4% by mass, further preferably within a range from 10.5 to 12.0% by mass, particularly preferably within a range from 10.6 to 11.9% by mass and most preferably within a range from 11.1 to 11.9% by mass. In this way, the glass composition for glass fiber can obtain an effect to be able to suppress the precipitation of the red crystals while the low linear expansion coefficient is being maintained.

In the glass composition for glass fiber, when the total content of $SiO_2$, $Al_2O_3$, MgO and CaO in relation to the total amount of the glass composition for glass fiber is less than 98.0% by mass, the content of other impurity components comes to be relatively larger. Consequently, in the production of glass fibers from the glass composition for glass fiber, the working temperature range is narrowed, or it is impossible to heighten the fiber strength or the fiber modulus of elasticity of the obtained glass fibers.

In the glass composition for glass fiber of the present invention, the total content of $SiO_2$, $Al_2O_3$, MgO and CaO in relation to the total amount of the glass composition for glass fiber is preferably 98.0% by mass or more and less than 99.5% by mass and more preferably 98.5% by mass or more and less than 99.0% by mass. In this way, in the glass composition for glass fiber, the working temperature range can be widened, and it is possible to heighten the fiber strength and the fiber modulus of elasticity of the obtained glass fibers.

In the glass composition for glass fiber of the present invention, the ratio of the content (% by mass) of CaO to the content (% by mass) of $Al_2O_3$ (CaO (% by mass)/$Al_2O_3$ (% by mass)) preferably falls within a range from 0.50 to 0.72, and the ratio of the product of the content (% by mass) of $B_2O_3$ and the content (% by mass) of CaO to the content (% by mass) of $Al_2O_3$ (($B_2O_3$ (% by mass)×CaO (% by mass))/$Al_2O_3$ (% by mass)) preferably falls within a range from 0.22 to 1.00.

In addition, in the glass composition for glass fiber of the present invention, (CaO (% by mass)/$Al_2O_3$ (% by mass)) more preferably falls within a range from 0.53 to 0.70 and (($B_2O_3$ (% by mass)×CaO (% by mass))/$Al_2O_3$ (% by mass)) more preferably falls within a range from 0.27 to 0.78; and (CaO (% by mass)/$Al_2O_3$ (% by mass)) further preferably falls within a range from 0.53 to 0.64 and (($B_2O_3$ (% by mass)×CaO (% by mass))/$Al_2O_3$ (% by mass)) further preferably falls within a range from 0.28 to 0.64. According to the glass composition for glass fiber of the present invention, in this way, it is possible to obtain an effect to be able to suppress the precipitation of the red crystals while the high fiber modulus of elasticity is being maintained in the obtained glass fibers.

Additionally, in the glass composition for glass fiber of the present invention, the glass fibers produced from the glass composition for glass fiber may include $Cr_2O_3$ in a content of 0.001 to 0.010% by mass and preferably 0.001 to 0.005% by mass. When the content of $Cr_2O_3$ falls within the above-described range, the glass fibers produced from the glass composition for glass fiber of the present invention can suppress, in the production of molded articles such as composite materials, the generation of the color unevenness, color change, exterior appearance failure or the like due to the coloration of the glass.

The glass composition for glass fiber of the present invention may include $Na_2O$ and $K_2O$ in addition to the above-described components. $Na_2O$ and $K_2O$ are usually added for the purpose of lowering the viscosity of the glass to facilitate the melting of the glass; however, the addition of $Na_2O$ and $K_2O$ degrades the strength or the chemical resistance of the glass, and accordingly, the total content of $Na_2O$ and $K_2O$ in relation to the total amount of the glass composition for glass fiber is set to fall preferably within a range from 0.05 to 1.0% by mass.

The glass composition for glass fiber of the present invention may include $Fe_2O_3$. $Fe_2O_3$ is usually present as an impurity in the glass raw materials; however, $Fe_2O_3$ affects the absorption of radiation heat in the molten glass or the coloration of the glass fibers, and accordingly the content of $Fe_2O_3$ in relation to the total amount of the glass composition for glass fiber is set to fall preferably within a range from 0.05 to 1.0% by mass.

In addition, in the glass composition for glass fiber of the present invention, when $Na_2O$, $K_2O$ and $Fe_2O_3$ are included, the total content of $Na_2O$, $K_2O$ and $Fe_2O_3$ in relation to the total amount of the glass composition for glass fiber is set to fall preferably within a range from 0.1 to 2.0% by mass and more preferably within a range from 0.1 to 0.5% by mass.

In the glass composition for glass fiber of the present invention, the measurements of the above-described respective components can be performed for B, a light element, by using an ICP emission spectrophotometer, and for the other elements by using a wavelength dispersion fluorescent X-ray analyzer.

Specifically, the measurement method is described. First, a glass batch (a mixture prepared by mixing the glass raw materials), or glass fibers (used after removing an organic substance(s), for example, by heating in a muffle furnace set at 300 to 600° C. for approximately 2 to 24 hours, when organic substances attach to the surface of the glass fibers, or when the glass fibers are included in an organic substance (resin) as an reinforcing material) are placed in a platinum crucible, and maintained in an electric furnace at a temperature of 1550° C. for 6 hours to be melted under stirring to yield a uniform molten glass. Next, the obtained molten glass is allowed to flow out on a carbon plate to prepare glass cullet, and then the cullets are crushed into a powder. B, a light element, is quantitatively analyzed by using an ICP emission spectrophotometer, after the glass powder is subjected to alkali fusion decomposition. The other elements are quantitatively analyzed by using a wavelength dispersion fluorescent X-ray analyzer, after the glass powder is molded into a circular disk shape with a pressing machine. The contents and the total amount of the respective components are calculated by converting these quantitative analysis results into the values expressed in terms of oxides, and from the resulting numerical values, the above-described contents of the respective components can be determined.

In addition, the glass composition for glass fiber of the present invention is preferably such that the fiber modulus of elasticity, the linear expansion coefficient and the fiber strength of the glass fibers produced from the glass composition for glass fiber are 83 GPa or more, 4.2 ppm/K or less and 4.0 GPa or more, respectively. According to the glass composition for glass fiber of the present invention, the fiber modulus of elasticity, the linear expansion coefficient and the fiber strength are respectively set within the above-described ranges, and glass fibers having a higher fiber strength and a higher fiber modulus of elasticity than the general-purpose glass (E-glass) can be obtained.

In addition, according to the glass composition for glass fiber of the present invention, the generation of the red crystals can be suppressed in the production process of the glass composition, and hence it is possible to efficiently obtain glass fibers having non-circular cross sections such as flat shaped glass fibers, and glass fibers having perfect circular cross sections and fiber diameters falling within a range of 3 µm or more and less than 10 µm. Here, examples of the glass fibers having non-circular cross sections such as flat shapes include the glass fibers each having the ratio (major axis/minor axis) of the major axis to the minor axis of the cross sectional shape falling within a range from 2.0 to 6.0 and the fiber diameter defined as the diameter of the perfect circle having the same area as the actual cross-sectional area of the fiber falling within a range from 10 to 30 µm. Examples of the cross sectional shapes possessed by glass fibers having such non-circular cross sections include: an oval shape (a rectangle with two semicircles on its smaller sides as diameters, added outside; or a shape similar to this shape), an elliptical shape, and an cocoon-like shape narrow in the lengthwise mid-portion; the cross section of the glass fibers is preferably an oval shape because the oval shape leads to an excellent fluidity in the production of the resin molded articles including the glass fibers.

DESCRIPTION OF EMBODIMENTS

Figure 1:
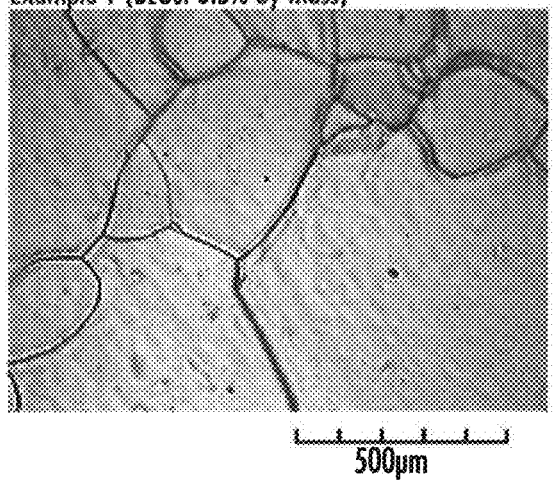
FIG. 1 is a laser microscope photograph showing the occurrence or nonoccurrence of the red crystals in the glass obtained from the glass composition for glass fiber of Example 1.

Hereinafter, the embodiments of the present invention are described in more detail.

The glass composition for glass fiber of present Embodiment includes, in relation to the total amount thereof, $SiO_2$ in a content falling within a range from 57.0 to 60.0% by mass, $Al_2O_3$ in a content falling within a range from 17.5 to 20.0% by mass, MgO in a content falling within a range from 8.5 to 12.0% by mass, CaO in a content falling within a range from 10.0 to 13.0% by mass and $B_2O_3$ in a content falling within a range from 0.5 to 1.5% by mass, and the total content of $SiO_2$, $Al_2O_3$, MgO and CaO is 98.0% by mass or more.

The glass composition for glass fiber includes $B_2O_3$ as an additive capable of suppressing the generation of the red crystals, in a content falling within the foregoing range, accordingly can prevent the mixing of the red crystals into the obtained glass fibers, and allows the production of glass fibers to be performed stably. The glass composition for glass fiber includes $SiO_2$, $Al_2O_3$, MgO and CaO in the foregoing contents in relation to the total amount of the glass composition for glass fiber, and accordingly even when $B_2O_3$ is added in a content falling within the foregoing range, it is possible to produce glass fibers having a higher fiber strength and a higher fiber modulus of elasticity than the general-purpose glass.

The glass composition for glass fiber can be obtained by melting the glass raw materials (glass batch) mixed so as to give the foregoing composition.

In the glass composition for glass fiber having the foregoing composition, the 1000-poise temperature is a temperature falling within a range from 1300 to 1350° C., and the liquidus temperature is a temperature falling within a range from 1200 to 1250° C. In this case, the working temperature range, a temperature range between the 1000-poise temperature and the liquidus temperature, is 50° C. or higher, and accordingly a stable spinning is made possible, and such a working temperature range is suitable for a large-scale production of glass fibers, having a monthly production capacity of a few hundred tons or more. In the glass composition for glass fiber having the foregoing composition, the working temperature range is, for example, a range from 100 to 130° C., preferably a range from 102 to 125° C. and more preferably a range from 105 to 122° C.

In the production of glass fibers from the glass composition for glass fiber, the glass raw materials mixed as described above are supplied to a melting furnace, and melted in a temperature region equal to or higher than the 1000-poise temperature, specifically at a temperature falling within a temperature range from 1450 to 1550° C. The molten glass melted at the foregoing temperature is discharged from the nozzle tips of a bushing controlled at a predetermined temperature, taken up at a high speed and thus cooled while being stretched, and thus solidified to form glass fibers.

The foregoing melting furnace is a large-scale furnace having a monthly production capacity of a few hundred tons or more, the heating in the furnace is performed by, for example, indirect flame heating using gas burners, and chromium oxide bricks, excellent in glass abrasion resistance at high temperatures, are used in the portion brought into contact with the molten glass.

As the foregoing nozzle tips, for example, when glass fibers having non-circular cross sections such as flat shaped glass fibers are produced, it is possible to use nozzle tips formed in the nozzle plate on the bottom of the bushing, with the openings (orifice holes) each having an opening size such that the ratio of the major axis to the minor axis (major axis/minor axis) falls within a range from 2 to 10, and the major axis is 1.0 to 10.0 mm and the minor axis is 0.5 to 2.0 mm, wherein the nozzle tips have cooling devices such as notches or protrusions to rapidly cool the molten glass having passed through the openings.

As the foregoing nozzle tips, for example, when glass fibers having perfect circular cross sections and having a fiber diameter of 3 μm or more and less than 10 μm are produced, it is possible to use nozzle tips each provided with a circular opening having an opening diameter of 0.5 to 1.5 mm.

When the glass fibers having non-circular cross sections such as flat shaped glass fibers are produced, the controlled temperature of the bushing is 1260 to 1350° C. When the controlled temperature of the bushing is lower than 1260° C., the viscosity of the molten glass is extremely high, and in addition, the controlled temperature approaches the liquidus temperature; consequently, the crystals originating from the glass (devitrification) tend to be precipitated. Therefore, the discharge from the nozzle tips is made difficult and the production of the glass fibers themselves is made difficult. When the controlled temperature of the bushing exceeds 1350° C., the viscosity of the molten glass is lowered, and the surface tension is allowed to act easily. Hence it is impossible to produce glass fibers having non-circular cross sections such as flat shaped glass fibers.

When glass fibers having perfect circular cross sections and having a fiber diameter of 3 μm or more and less than 10 μm are produced, the controlled temperature of the bushing is 1300 to 1450° C. When the controlled temperature of the bushing is lower than 1300° C., the viscosity of molten glass is high, accordingly the discharge from thin nozzle tips is difficult and the production of the glass fibers themselves is made difficult. When the controlled temperature of the bushing exceeds 1450° C., the molten glass discharged from the nozzle tips turns into droplets but not into fibers.

According to the glass composition for glass fiber of present Embodiment, by producing glass fibers as described above, the spinning can be stably performed without mixing of the red crystals into the glass fibers. Hereinafter, Examples and Comparative Examples of the present invention are presented.

EXAMPLES

Example 1

In present Example, first, a glass batch was prepared by mixing the respective glass raw materials so as to give, when the resulting mixture was melted, a melt of a glass composition (molten glass) for glass fiber including, in relation to the total amount thereof, SiO2 in a content of 59.3% by mass, Al2O3 in a content of 19.0% by mass, MgO in a content of 10.0% by mass, CaO in a content of 11.0% by mass, B2O3 in a content of 0.5% by mass, and Na2O, K2O and Fe2O3 as the other components in a content of 0.2% by mass. In the glass composition for glass fiber of present Example, the total content of $SiO_2$, $Al_2O_3$, MgO and CaO is 99.3% by mass. The composition of the glass composition for glass fiber of present Example is shown in Table 1.

Next, the glass batch was placed in a platinum crucible, and maintained in an electric furnace at a temperature of 1550° C. for 6 hours to be melted under stirring to yield a uniform molten glass. Next, the obtained molten glass was allowed to flow out on a carbon plate to prepare glass cullet. In this case, the 1000-poise temperature and the liquidus temperature of the molten glass were measured, and the working temperature range (ΔT) was calculated.

The glass cullet was melted in a platinum crucible by using a high temperature electric furnace equipped with a rotational viscometer (manufactured by Shibaura System Co., Ltd.), and the 1000-poise temperature was determined by measuring the temperature corresponding to the rotational viscosity of 1000 poises by continuously measuring the viscosity of the molten glass while the melting temperature was being varied by using a Brookfield rotation type viscometer.

The liquidus temperature was determined by the following procedure. First, the glass cullet was crushed, 40 g of the resulting glass particles having particle sizes of 0.5 to 1.5 mm were placed in a 180×20×15 mm platinum vessel with boat-like shape and heated for 8 hours or more in a tubular electric furnace having a temperature gradient of 1000 to 1400° C., then the glass particles were taken out from the tubular electric furnace and observed with a polarization microscope, and the positions from which the crystals (devitrification) originating from the glass started to be precipitated were specified. The temperature inside the tubular electric furnace was measured by using a type B thermocouple, and the temperature of the position at which the crystals started to be precipitated was determined to be taken as the liquidus temperature.

The difference between the 1000-poise temperature and the liquidus temperature measured by the foregoing methods was calculated as the working temperature range (ΔT). The results thus obtained are shown in Table 2.

Next, the obtained glass cullet was placed in a small cylindrical platinum bushing having a circular nozzle tip on the bottom of the vessel, and melted by heating to a predetermined temperature; the molten glass discharged from the nozzle tip was taken up at a predetermined speed and thus cooled and solidified while being stretched, and thus glass fibers having perfect circular cross sections and having a fiber diameter of 13 μm were obtained.

Next, a string of fiber (monofilament) between a nozzle tip and the winder was sampled, a string of fiber free from degradation due to contact or friction was used as a sample, and the fiber strength and the fiber modulus of elasticity of the glass fibers obtained in present Example were measured.

The fiber strength was obtained as follows: a monofilament free from scratches, degradations and the like due to contact, friction and the like was allowed to adhere to a sheet of predetermined backing paper with a hole of 25 mm in diameter in the center thereof to prepare a specimen, the specimen was set to the grips of a tensile tester (manufactured by Orientec Co., Ltd.), the ends of the sheet of backing paper were cut off, then a tensile test was performed at a crosshead speed of 5 mm/min, and the fiber strength was calculated from the maximum load value at break and the fiber cross-sectional area. The fiber cross-sectional area was calculated from the fiber diameter obtained by observing the monofilament with a scanning electron microscope (trade name: S-3400, manufactured by Hitachi, Ltd.). Those specimens undergoing filament cast-off or filament crease during the measurement were excluded, and the average value of the fiber strength values of the 30 specimens was taken as the measurement value of the fiber strength.

The fiber modulus of elasticity was obtained as follows: the monofilament was allowed to adhere to a sheet of predetermined backing paper with a hole of 50 mm in diameter in the center thereof to prepare a specimen, the specimen was set to the grips of the foregoing tensile tester, the ends of the sheet of backing paper were cut off, then a tensile test was performed at a crosshead speed of 5 mm/min, and the fiber modulus of elasticity was calculated from the initial strength variation value and the corresponding rate of elongation. Those specimens undergoing filament cast-off during the measurement were excluded, and the average value of the fiber modulus of elasticity values of the 15 specimens was taken as the measurement value of the fiber modulus of elasticity.

The linear expansion coefficient was measured as follows. First, the glass cullet was melted, and then the melt of the glass cullet was cooled to prepare a glass bulk material; the glass bulk material was heated at a distortion-removing temperature (660 to 750° C.) for 2 hours in order to remove the distortion of the glass bulk material, and cooled to room temperature (20 to 25° C.) over 8 hours; then from the glass bulk material, a 4×4×20 mm specimen was prepared. Next, the specimen was heated at a temperature increase rate of 10° C./min, the elongation magnitude was measured within a temperature range from 50 to 200° C. by using a thermal mechanical analyzer (manufactured by Hitachi High-Tech Science Corp.), and from the elongation magnitude, the linear expansion coefficient was calculated.

The fiber strength, the fiber modulus of elasticity and the linear expansion coefficient of the glass fiber obtained in present Example are shown in Table 2.

Next, in present Example, the relationship between the glass composition for glass fiber and the red crystals was verified by reproducing the situation leading to the generation of the infrequently-occurring red crystals in the production of glass fibers.

In present Example, $Cr_2O_3$ was added to the glass composition for glass fiber in order to reproduce the situation leading to the generation of the red crystals, the addition amount of $Cr_2O_3$ was based on the maximum concentration of $Cr_2O_3$ included in the glass lump staying in the glass melting furnace in which the portion in contact with the molten glass is formed of the chromium oxide bricks. In the glass lump, the $Cr_2O_3$ eluted over a long period of time from the chromium oxide bricks was condensed, and accordingly the concentration of the $Cr_2O_3$ capable of being included in the molten glass to be formed into fibers after passing through the melting furnace in a short time does not exceed the maximum concentration of $Cr_2O_3$ in the glass lump.

Accordingly, next, a glass batch was prepared so as to contain chromium oxide ($Cr_2O_3$) in a content of 0.10% by mass in relation to the total amount of the glass composition for glass fiber of present Example. Next, the chromium oxide-containing glass batch was placed in a platinum crucible, and maintained in an electric furnace at a temperature of 1550° C. for 6 hours to be melted under stirring to yield a uniform molten glass. Next, the obtained molten glass was allowed to flow out on a carbon plate to prepare glass cullet.

In a 60×30×15 mm platinum vessel with boat-like shape, 40 g of the obtained glass cullet was placed, melted in an electric furnace at 1550° C. for 2 hours, then decreased in temperature to 1250° C. lower than the controlled temperature of the bushing, and maintained at 1250° C. for 12 hours. Next, the glass was removed from the platinum vessel with boat-like shape, the interface portion on the platinum surface with the glass was observed by using a laser microscope (trade name: Laser Scanning Microscope LEXT OLS, manufactured by Olympus Corp.) at a magnification of 200, and thus the occurrence or nonoccurrence of the red crystals was examined. The results thus obtained are shown in FIG. 1 and Table 2.

It is to be noted that when the number of the crystals of 10 μm or more was 5 or less in the view field (1.30×1.05 mm) at the microscope magnification of 200, the precipitation of the red crystals was determined not to occur.

Example 2

In present Example, first, a glass batch was obtained in exactly the same manner as in Example 1 except that the glass batch was prepared by mixing the respective glass raw materials so as to give, when the resulting mixture was melted, a melt of a glass composition for glass fiber (molten glass) including, in relation to the total amount thereof, $SiO_2$ in a content of 58.8% by mass and $B_2O_3$ in a content of 1.0% by mass. In the glass composition for glass fiber of present Example, the total content of $SiO_2$, $Al_2O_3$, MgO and CaO is 98.8% by mass. The composition of the glass composition for glass fiber of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquidus temperature, the working temperature range and the linear expansion coefficient of the glass composition for glass fiber of present Example, and the fiber strength and the fiber modulus of elasticity of the glass fibers (monofilaments) obtained in present Example. The results thus obtained are shown in Table 2.

Figure 2:
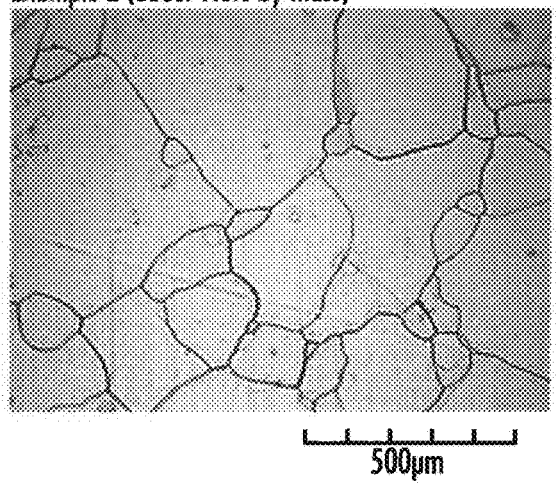
FIG. 2 is a laser microscope photograph showing the occurrence or nonoccurrence of the red crystals in the glass obtained from the glass composition for glass fiber of Example 2.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 2 and Table 2.

Example 3

In present Example, first, a glass batch was obtained in exactly the same manner as in Example 1 except that the glass batch was prepared by mixing the respective glass raw materials so as to give, when the resulting mixture was melted, a melt of a glass composition for glass fiber (molten glass) including, in relation to the total amount thereof, $SiO_2$ in a content of 58.3% by mass and $B_2O_3$ in a content of 1.5% by mass. In the glass composition for glass fiber of present Example, the total content of $SiO_2$, $Al_2O_3$, MgO and CaO is 98.3% by mass. The composition of the glass composition for glass fiber of present Example is shown in Table 1.

Next, glass cullet was prepared in exactly the same manner as in Example 1 except that the glass batch of present Example was used, and glass fibers were spun in exactly the same manner as in Example 1 except that the glass cullet was used. Next, the following quantities were measured in exactly the same manner as in Example 1: the 1000-poise temperature, the liquidus temperature, the working temperature range and the linear expansion coefficient of the glass composition for glass fiber of present Example, and the fiber strength and the fiber modulus of elasticity of the glass fibers (monofilaments) obtained in present Example. The results thus obtained are shown in Table 2.

Figure 3:
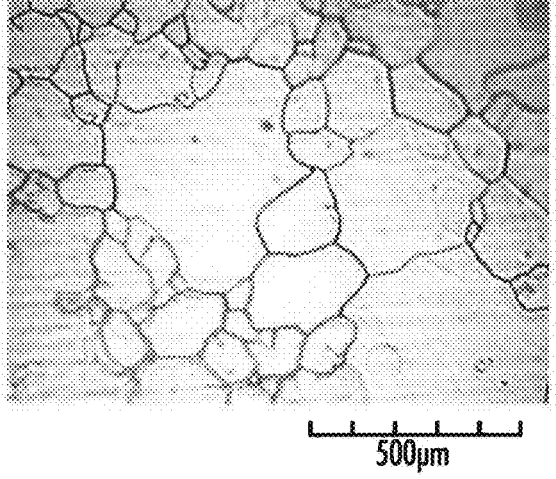
FIG. 3 is a laser microscope photograph showing the occurrence or nonoccurrence of the red crystals in the glass obtained from the glass composition for glass fiber of Example 3.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 3 and Table 2.

Comparative Example 1

In present Comparative Example, first, a glass batch was obtained in exactly the same manner as in Example 1 except that the glass batch was prepared by mixing the respective glass raw materials so as to give, when the resulting mixture was melted, a melt of a glass composition for glass fiber (molten glass) including, in relation to the total amount thereof, $SiO_2$ in a content of 59.8% by mass and absolutely not including $B_2O_3$. In the glass composition for glass fiber of present Comparative Example, the total content of $SiO_2$, $Al_2O_3$, MgO and CaO is 99.8% by mass. The composition of the glass composition for glass fiber of present Comparative Example is shown in Table 1.

Next, glass cullet was prepared in exactly the same manner as in Example 1 except that the glass batch of present Comparative Example was used, and glass fibers were spun in exactly the same manner as in Example 1 except that the glass cullet was used. Next, the following quantities were measured in exactly the same manner as in Example 1: the 1000-poise temperature, the liquidus temperature, the working temperature range and the linear expansion coefficient of the glass composition for glass fiber of present Comparative Example, and the fiber strength and the fiber modulus of elasticity of the glass fibers (monofilaments) obtained in present Comparative Example. The results thus obtained are shown in Table 2.

Figure 4:
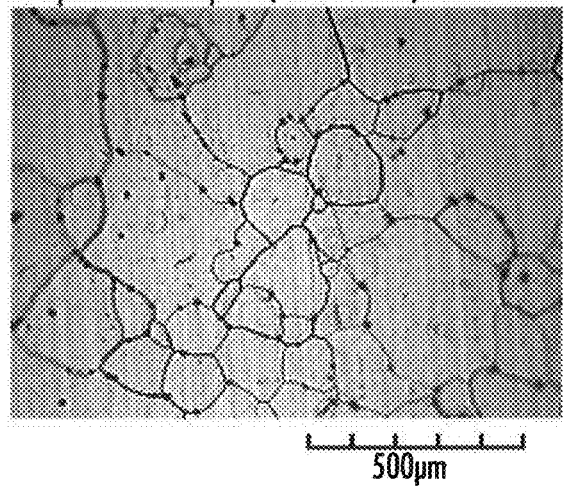
FIG. 4 is a laser microscope photograph showing the occurrence or nonoccurrence of the red crystals in the glass obtained from the glass composition for glass fiber of Comparative Example 1.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 4 and Table 2.

Comparative Example 2

In present Comparative Example, first, a glass batch was obtained in exactly the same manner as in Example 1 except that the glass batch was prepared by mixing the respective glass raw materials so as to give, when the resulting mixture was melted, a melt of a glass composition for glass fiber (molten glass) including, in relation to the total amount thereof, $SiO_2$ in a content of 59.5% by mass and $B_2O_3$ in a content of 0.3% by mass. In the glass composition for glass fiber of present Comparative Example, the total content of $SiO_2$, $Al_2O_3$, MgO and CaO is 99.5% by mass. The composition of the glass composition for glass fiber of present Comparative Example is shown in Table 1.

Next, glass cullet was prepared in exactly the same manner as in Example 1 except that the glass batch of present Comparative Example was used, and glass fibers were spun in exactly the same manner as in Example 1 except that the glass cullet was used. Next, the following quantities were measured in exactly the same manner as in Example 1: the 1000-poise temperature, the liquidus temperature, the working temperature range and the linear expansion coefficient of the glass composition for glass fiber of present Comparative Example, and the fiber strength and the fiber modulus of elasticity of the glass fibers (monofilaments) obtained in present Comparative Example. The results thus obtained are shown in Table 2.

Figure 5:
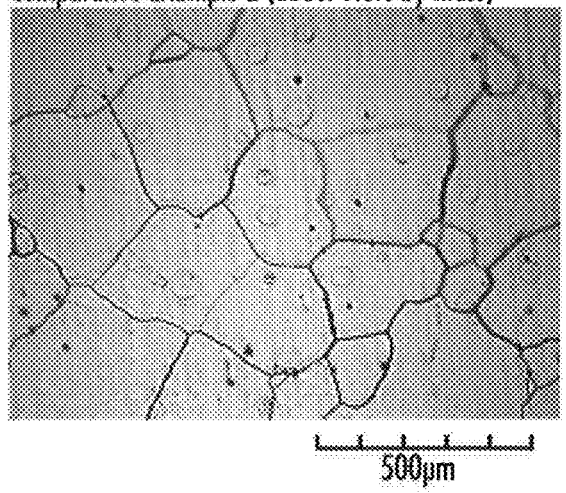
FIG. 5 is a laser microscope photograph showing the occurrence or nonoccurrence of the red crystals in the glass obtained from the glass composition for glass fiber of Comparative Example 2.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 5 and Table 2.

Comparative Example 3

In present Comparative Example, first, a glass batch was obtained in exactly the same manner as in Example 1 except that the glass batch was prepared by mixing the respective glass raw materials so as to give, when the resulting mixture was melted, a melt of a glass composition for glass fiber (molten glass) including, in relation to the total amount thereof, $SiO_2$ in a content of 57.8% by mass and $B_2O_3$ in a content of 2.0% by mass. In the glass composition for glass fiber of present Comparative Example, the total content of $SiO_2$, $Al_2O_3$, MgO and CaO is 97.8% by mass. The composition of the glass composition for glass fiber of present Comparative Example is shown in Table 1.

Next, glass cullet was prepared in exactly the same manner as in Example 1 except that the glass batch of present Comparative Example was used, and glass fibers were spun in exactly the same manner as in Example 1 except that the glass cullet was used. Next, the following quantities were measured in exactly the same manner as in Example 1: the 1000-poise temperature, the liquidus temperature, the working temperature range and the linear expansion coefficient of the glass composition for glass fiber of present Comparative Example, and the fiber strength and the fiber modulus of elasticity of the glass fibers (monofilaments) obtained in present Comparative Example. The results thus obtained are shown in Table 2.

Figure 6:
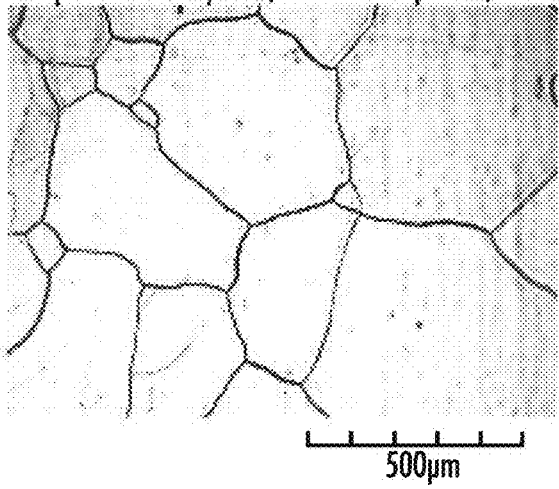
FIG. 6 is a laser microscope photograph showing the occurrence or nonoccurrence of the red crystals in the glass obtained from the glass composition for glass fiber of Comparative Example 3.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 6 and Table 2.

TABLE 1

|  | Example 1 | Example 2 | Example 3 | Comparative Example 1 | Comparative Example 2 | Comparative Example 3 |
| --- | --- | --- | --- | --- | --- | --- |
| $SiO_2$ (% by mass) | 59.3 | 58.8 | 58.3 | 59.8 | 59.5 | 57.8 |
| $Al_2O_3$ (% by mass) | 19.0 | 19.0 | 19.0 | 19.0 | 19.0 | 19.0 |
| MgO (% by mass) | 10.0 | 10.0 | 10.0 | 10.0 | 10.0 | 10.0 |
| CaO (% by mass) | 11.0 | 11.0 | 11.0 | 11.0 | 11.0 | 11.0 |
| $B_2O_3$ (% by mass) | 0.5 | 1.0 | 1.5 | — | 0.3 | 2.0 |

TABLE 1-continued

|  | Example 1 | Example 2 | Example 3 | Comparative Example 1 | Comparative Example 2 | Comparative Example 3 |
|---|---|---|---|---|---|---|
| Others (% by mass) | 0.2 | 0.2 | 0.2 | 0.2 | 0.2 | 0.2 |
| CaO/Al$_2$O$_3$ | 0.58 | 0.58 | 0.58 | 0.58 | 0.58 | 0.58 |
| (B$_2$O$_3$ × CaO)/Al$_2$O$_3$ | 0.29 | 0.58 | 0.87 | 0 | 0.17 | 1.16 |

In the table, "CaO/Al$_2$O$_3$" represents "CaO (% by mass)/Al$_2$O$_3$ (% by mass)." "(B$_2$O$_3$ × CaO)/Al$_2$O$_3$" represents "(B$_2$O$_3$ (% by mass) × CaO (% by mass))/Al$_2$O$_3$ (% by mass)."

TABLE 2

|  | Example 1 | Example 2 | Example 3 | Comparative Example 1 | Comparative Example 2 | Comparative Example 3 |
|---|---|---|---|---|---|---|
| 1000-Poise temperature (° C.) | 1338 | 1331 | 1321 | 1346 | 1342 | 1318 |
| Liquidus temperature (° C.) | 1229 | 1221 | 1215 | 1236 | 1233 | 1207 |
| Working temperature range (° C.) | 109 | 110 | 106 | 110 | 109 | 111 |
| Fiber strength (GPa) | 4.3 | 4.2 | 4.1 | 4.4 | 4.3 | 3.9 |
| Fiber modulus of elasticity (GPa) | 85 | 84 | 83 | 86 | 85 | 82 |
| Linear expansion coefficient (ppm/K) | 4.0 | 4.0 | 4.0 | 4.0 | 4.0 | 4.1 |
| Occurrence/nonoccurrence of red crystals | Not observed | Not observed | Not observed | Observed | Observed | Not observed |

As can be seen from FIGS. 4 and 5 and Table 1, when the content of B$_2$O$_3$ is less than 0.5% by mass of the total amount of the glass composition for glass fiber (Comparative Examples 1 and 2), microparticles (red crystals) are generated in the glass structure of the glass cullet.

In contrast, as can be seen from FIGS. 1 to 3 and Table 1, when the content of B$_2$O$_3$ falls within a range from 0.5 to 1.5% by mass of the total amount of the glass composition for glass fiber (Examples 1 to 3), microparticles (red crystals) are not generated at all in the glass structure of the glass cullet.

As can be seen from FIG. 6 and Table 1, when the content of B$_2$O$_3$ exceeds 1.5% by mass of the total amount of the glass composition for glass fiber (Comparative Example 3), microparticles (red crystals) are not generated in the glass structure of the glass cullet, but it is impossible to obtain a sufficient fiber modulus of elasticity of 83 GPa or more and a sufficient fiber strength of 4.0 GPa or more.

Moreover, as is obvious from Tables 1 and 2, according to the glass compositions for glass fiber in each of Examples 1 to 3 in which in the composition of the glass composition for glass fiber of Comparative Example 1, 0.5 to 1.5% by mass of B$_2$O$_3$ is contained and the content of SiO$_2$ is reduced by the content of B$_2$O$_3$, it is possible to obtain, in the glass fiber, a fiber strength and a fiber modulus of elasticity equivalent to the fiber strength and the fiber modulus of elasticity of Comparative Example 1.

Example 4

In present Example, first, there was obtained a glass batch prepared by mixing the respective glass raw materials so as to give, when the resulting mixture was melted, a melt of a glass composition for glass fiber (molten glass) including, in relation to the total amount thereof, SiO$_2$ in a content of 58.8% by mass, Al$_2$O$_3$ in a content of 19.5% by mass, MgO in a content of 9.0% by mass, CaO in a content of 12.0% by mass, B$_2$O$_3$ in a content of 0.5% by mass, and Na$_2$O, K$_2$O and Fe$_2$O$_3$ as the other components in a content of 0.2% by mass. In the glass composition for glass fiber of present Example, the total content of SiO$_2$, Al$_2$O$_3$, MgO and CaO is 99.3% by mass. The composition of the glass composition for glass fiber of present Example is shown in Table 3.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 3.

Figure 7:
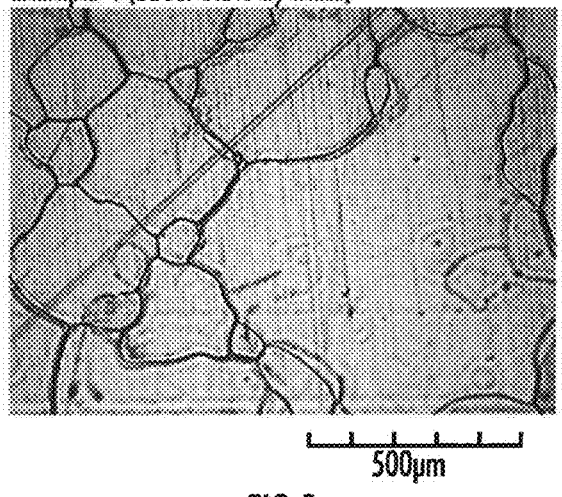
FIG. 7 is a laser microscope photograph showing the occurrence or nonoccurrence of the red crystals in the glass obtained from the glass composition for glass fiber of Example 4.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape 1, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 7 and Table 3.

Example 5

In present Example, first, a glass batch was obtained in exactly the same manner as in Example 4 except that the glass batch was prepared by mixing the respective glass raw materials so as to give, when the resulting mixture was melted, a melt of a glass composition for glass fiber (molten glass) including, in relation to the total amount thereof, Al$_2$O$_3$ in a content of 19.0% by mass and B$_2$O$_3$ in a content of 1.0% by mass. In the glass composition for glass fiber of present Example, the total content of SiO$_2$, Al$_2$O$_3$, MgO and CaO is 98.8% by mass. The composition of the glass composition for glass fiber of present Example is shown in Table 3.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 3.

Figure 8:
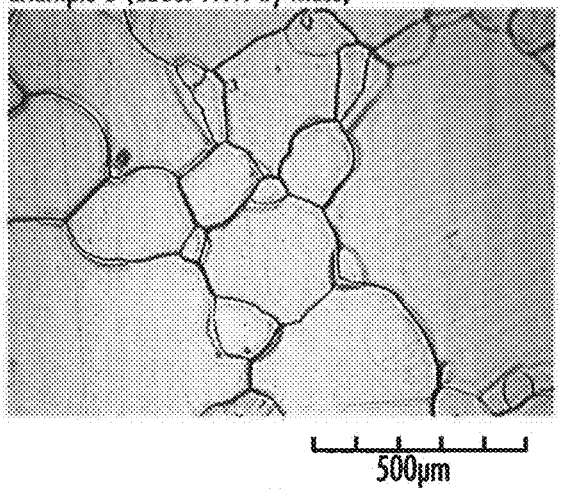
FIG. 8 is a laser microscope photograph showing the occurrence or nonoccurrence of the red crystals in the glass obtained from the glass composition for glass fiber of Example 5.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape 1, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 8 and Table 3.

Example 6

In present Example, first, a glass batch was obtained in exactly the same manner as in Example 4 except that the glass batch was prepared by mixing the respective glass raw materials so as to give, when the resulting mixture was melted, a melt of a glass composition for glass fiber (molten glass) including, in relation to the total amount thereof, $Al_2O_3$ in a content of 18.5% by mass and $B_2O_3$ in a content of 1.5% by mass. In the glass composition for glass fiber of present Example, the total content of $SiO_2$, $Al_2O_3$, MgO and CaO is 98.3% by mass. The composition of the glass composition for glass fiber of present Example is shown in Table 3.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 3.

Figure 9:
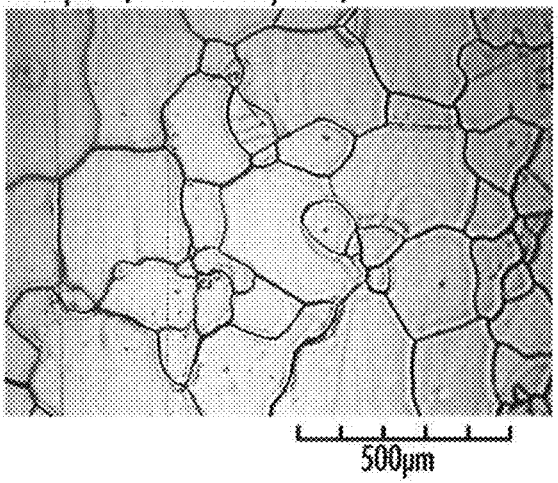
FIG. 9 is a laser microscope photograph showing the occurrence or nonoccurrence of the red crystals in the glass obtained from the glass composition for glass fiber of Example 6.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 9 and Table 3.

Example 7

In present Example, first, a glass batch was obtained in exactly the same manner as in Example 5 except that the glass batch was prepared by mixing the respective glass raw materials so as to give, when the resulting mixture was melted, a melt of a glass composition for glass fiber (molten glass) including, in relation to the total amount thereof, $Al_2O_3$ in a content of 18.2% by mass, MgO in a content of 10.0% by mass and CaO in a content of 11.8% by mass. In the glass composition for glass fiber of present Example, the total content of $SiO_2$, $Al_2O_3$, MgO and CaO is 98.8% by mass. The composition of the glass composition for glass fiber of present Example is shown in Table 3.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 3.

Figure 10:
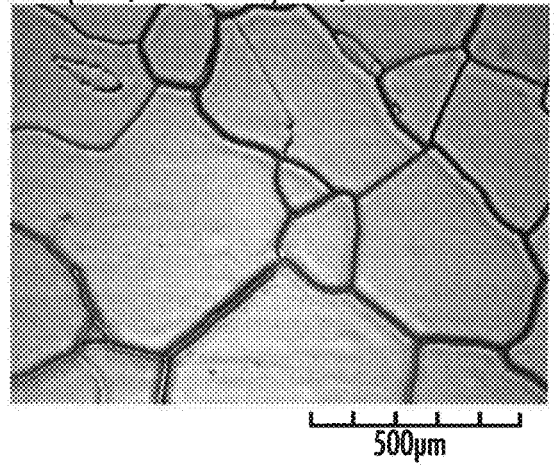
FIG. 10 is a laser microscope photograph showing the occurrence or nonoccurrence of the red crystals in the glass obtained from the glass composition for glass fiber of Example 7.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 10 and Table 3.

Comparative Example 4

In present Comparative Example, first, a glass batch was obtained in exactly the same manner as in Example 4 except that the glass batch was prepared by mixing the respective glass raw materials so as to give, when the resulting mixture was melted, a melt of a glass composition for glass fiber (molten glass) including, in relation to the total amount thereof, $Al_2O_3$ in a content of 20.0% by mass and absolutely not including $B_2O_3$. In the glass composition for glass fiber of present Comparative Example, the total content of $SiO_2$, $Al_2O_3$, MgO and CaO is 99.8% by mass. The composition of the glass composition for glass fiber of present Comparative Example is shown in Table 3.

Figure 11:
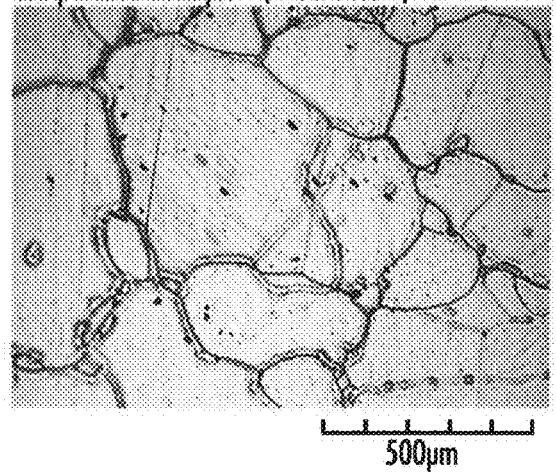
FIG. 11 is a laser microscope photograph showing the occurrence or nonoccurrence of the red crystals in the glass obtained from the glass composition for glass fiber of Comparative Example 4.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape 1, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 11 and Table 3.

TABLE 3

|  | Example 4 | Example 5 | Example 6 | Example 7 | Comparative Example 4 |
|---|---|---|---|---|---|
| $SiO_2$ (% by mass) | 58.8 | 58.8 | 58.8 | 58.8 | 58.8 |
| $Al_2O_3$ (% by mass) | 19.5 | 19.0 | 18.5 | 18.2 | 20.0 |
| MgO (% by mass) | 9.0 | 9.0 | 9.0 | 10.0 | 9.0 |
| CaO (% by mass) | 12.0 | 12.0 | 12.0 | 11.8 | 12.0 |
| $B_2O_3$ (% by mass) | 0.5 | 1.0 | 1.5 | 1.0 | — |
| Others (% by mass) | 0.2 | 0.2 | 0.2 | 0.2 | 0.2 |
| $CaO/Al_2O_3$ | 0.62 | 0.63 | 0.65 | 0.65 | 0.60 |
| $(B_2O_3 \times CaO)/Al_2O_3$ | 0.31 | 0.63 | 0.97 | 0.65 | 0 |
| Fiber strength (GPa) | 4.2 | 4.3 | 4.0 | 4.2 | — |
| Fiber modulus of elasticity (GPa) | 84 | 84 | 83 | 83 | — |
| Occurrence/nonoccurrence of red crystals | Not observed | Not observed | Not observed | Not observed | Observed |

In the table, "$CaO/Al_2O_3$" represents "CaO (% by mass)/$Al_2O_3$ (% by mass)." "$(B_2O_3 \times CaO)/Al_2O_3$" represents "($B_2O_3$ (% by mass) × CaO (% by mass))/$Al_2O_3$ (% by mass)."

As can be seen from FIG. 11 and Table 3, in the case of Comparative Example 4 absolutely not including $B_2O_3$, microparticles (red crystals) are generated in the glass structure of the glass cullet.

In contrast, as is obvious from FIGS. 7 to 10 and Table 3, it is possible to get rid of the precipitation of the red crystals, according to the glass compositions for glass fiber of Examples 4 to 6 in which in the composition of the glass composition for glass fiber of Comparative Example 4, 0.5 to 1.5% by mass of $B_2O_3$ is included and the content of $Al_2O_3$ is reduced by the content of $B_2O_3$, and according to the glass composition for glass fiber of Example 7 in which 1.0% by mass of $B_2O_3$ is included, the content of $Al_2O_3$ and the content of CaO are reduced and the content of MgO is increased.

Example 8

In present Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 58.3% by mass, $Al_2O_3$ in a content of 19.0% by mass, MgO in a content of 12.0% by mass, CaO in a content of 10.0% by mass, $B_2O_3$ in a content of 0.5% by mass, and $Na_2O$, $K_2O$ and $Fe_2O_3$ as the other components in a content of 0.2% by mass. In the glass composition for glass fiber of present Example, the total content of $SiO_2$, $Al_2O_3$, MgO and CaO is 99.3% by mass. The composition of the glass composition for glass fiber of present Example is shown in Table 4.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 4.

Figure 12:
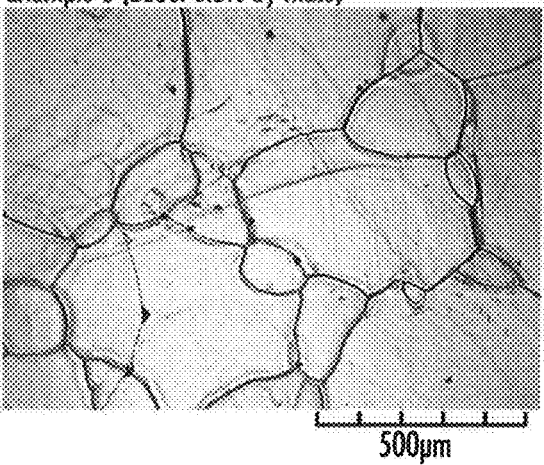
FIG. 12 is a laser microscope photograph showing the occurrence or nonoccurrence of the red crystals in the glass obtained from the glass composition for glass fiber of Example 8.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 12 and Table 4.

Example 9

In present Example, first, a glass batch was obtained in exactly the same manner as in Example 8 except that the glass batch was prepared by mixing the respective glass raw materials so as to give, when the resulting mixture was melted, a melt of a glass composition for glass fiber (molten glass) including, in relation to the total amount thereof, $Al_2O_3$ in a content of 18.7% by mass, MgO in a content of 11.8% by mass and $B_2O_3$ in a content of 1.0% by mass. In the glass composition for glass fiber of present Example, the total content of $SiO_2$, $Al_2O_3$, MgO and CaO is 98.8% by mass. The composition of the glass composition for glass fiber of present Example is shown in Table 4.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 4.

Figure 13:
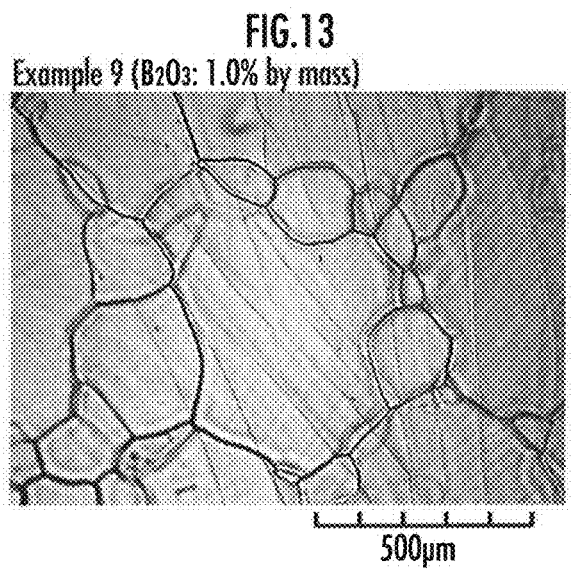
FIG. 13 is a laser microscope photograph showing the occurrence or nonoccurrence of the red crystals in the glass obtained from the glass composition for glass fiber of Example 9.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape 1, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 13 and Table 4.

Example 10

In present Example, first, a glass batch was obtained in exactly the same manner as in Example 8 except that the glass batch was prepared by mixing the respective glass raw materials so as to give, when the resulting mixture was melted, a melt of a glass composition for glass fiber (molten glass) including, in relation to the total amount thereof, $Al_2O_3$ in a content of 18.5% by mass, MgO in a content of 11.5% by mass and $B_2O_3$ in a content of 1.5% by mass. In the glass composition for glass fiber of present Example, the total content of $SiO_2$, $Al_2O_3$, MgO and CaO is 98.3% by mass. The composition of the glass composition for glass fiber of present Example is shown in Table 4.

Next, glass cullet was prepared in exactly the same manner as in Example 1 except that the glass batch of present Example was used, and glass fibers were spun in exactly the same manner as in Example 1 except that the glass cullet was used. Next, in exactly the same manner as in Example 1, the fiber strength and the fiber modulus of elasticity of the glass fibers (monofilaments) obtained in present Example were measured. The results thus obtained are shown in Table 4.

Figure 14:
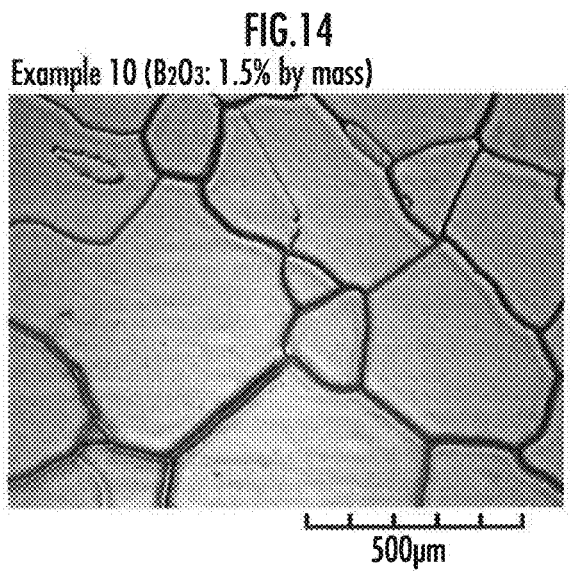
FIG. 14 is a laser microscope photograph showing the occurrence or nonoccurrence of the red crystals in the glass obtained from the glass composition for glass fiber of Example 10.

Next, a chromium oxide-containing glass batch was prepared in exactly the same manner as in Example 1 except that the glass batch obtained in present Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 14 and Table 4.

Comparative Example 5

In present Comparative Example, first, a glass batch was obtained in exactly the same manner as in Example 8 except that the glass batch was prepared by mixing the respective glass raw materials so as to give, when the resulting mixture was melted, a melt of a glass composition for glass fiber (molten glass) including, in relation to the total amount thereof, $SiO_2$ in a content of 58.8% by mass and absolutely not including $B_2O_3$. In the glass composition for glass fiber of present Comparative Example, the total content of $SiO_2$, $Al_2O_3$, MgO and CaO is 99.8% by mass. The composition of the glass composition for glass fiber of present Comparative Example is shown in Table 4.

Figure 15:
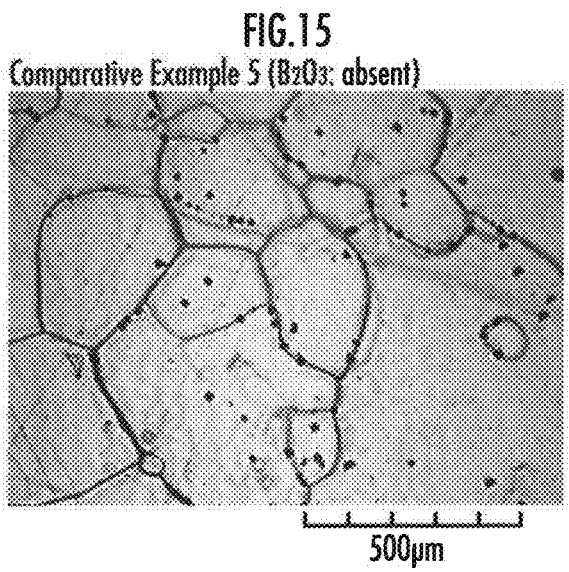
FIG. 15 is a laser microscope photograph showing the occurrence or nonoccurrence of the red crystals in the glass obtained from the glass composition for glass fiber of Comparative Example 5.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape 1, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 15 and Table 4.

TABLE 4

|  | Example 8 | Example 9 | Example 10 | Comparative Example 5 |
|---|---|---|---|---|
| $SiO_2$ (% by mass) | 58.3 | 58.3 | 58.3 | 58.8 |
| $Al_2O_3$ (% by mass) | 19.0 | 18.7 | 18.5 | 19.0 |
| MgO (% by mass) | 12.0 | 11.8 | 11.5 | 12.0 |
| CaO (% by mass) | 10.0 | 10.0 | 10.0 | 10.0 |
| $B_2O_3$ (% by mass) | 0.5 | 1.0 | 1.5 | — |
| Others (% by mass) | 0.2 | 0.2 | 0.2 | 0.2 |
| CaO/$Al_2O_3$ | 0.53 | 0.53 | 0.54 | 0.53 |
| ($B_2O_3$ × CaO)/$Al_2O_3$ | 0.26 | 0.53 | 0.81 | 0 |
| Fiber strength (GPa) | 4.1 | 4.2 | 4.0 | — |
| Fiber modulus of elasticity (GPa) | 84 | 84 | 84 | — |
| Occurrence/nonoccurrence of red crystals | Not observed | Not observed | Not observed | Observed |

In the table, "CaO/$Al_2O_3$" represents "CaO (% by mass)/$Al_2O_3$ (% by mass)." "($B_2O_3$ × CaO)/$Al_2O_3$" represents "($B_2O_3$ (% by mass) × CaO (% by mass))/$Al_2O_3$ (% by mass)."

As can be seen from FIG. 15 and Table 4, in the case of Comparative Example 5 absolutely not including $B_2O_3$, microparticles (red crystals) are generated in the glass structure of the glass cullet.

In contrast, as is obvious from FIGS. 12 to 14 and Table 4, it is possible to get rid of the precipitation of the red crystals, according to the glass compositions for glass fiber of Examples 8 to 10 in which in the composition of the glass composition for glass fiber of Comparative Example 5, 0.5 to 1.5% by mass of $B_2O_3$ is included and only the content of $SiO_2$ or the contents of $SiO_2$, $Al_2O_3$, MgO are reduced by the content of $B_2O_3$.

Comparative Example 6

In present Comparative Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 57.0% by mass, $Al_2O_3$ in a content of 22.0% by mass, MgO in a content of 9.8% by mass, CaO in a content of 10.0% by mass, $B_2O_3$ in a content of 1.0% by mass, and $Na_2O$, $K_2O$ and $Fe_2O_3$ as the other components in a content of 0.2% by mass. In the glass composition for glass fiber of present Comparative Example, the total content of $SiO_2$, $Al_2O_3$, MgO and CaO is 98.8% by mass. The composition of the glass composition for glass fiber of present Comparative Example is shown in Table 5.

Figure 16:
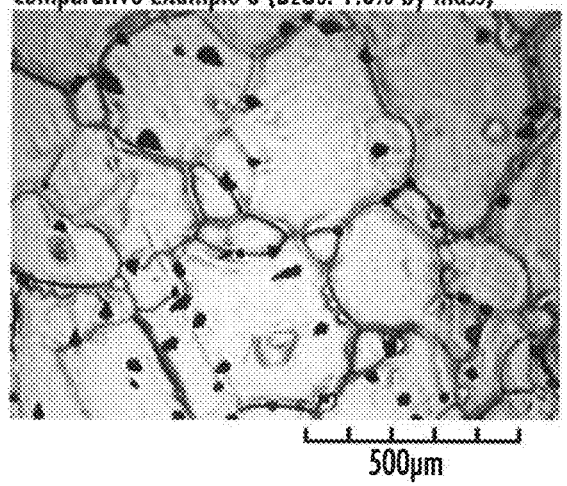
FIG. 16 is a laser microscope photograph showing the occurrence or nonoccurrence of the red crystals in the glass obtained from the glass composition for glass fiber of Comparative Example 6.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 16 and Table 5.

Comparative Example 7

In present Comparative Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 59.0% by mass, $Al_2O_3$ in a content of 20.0% by mass, MgO in a content of 12.0% by mass, CaO in a content of 7.8% by mass, $B_2O_3$ in a content of 1.0% by mass, and $Na_2O$, $K_2O$ and $Fe_2O_3$ as the other components in a content of 0.2% by mass. In the glass composition for glass fiber of present Comparative Example, the total content of $SiO_2$, $Al_2O_3$, MgO and CaO is 98.8% by mass. The composition of the glass composition for glass fiber of present Comparative Example is shown in Table 5.

Figure 17:
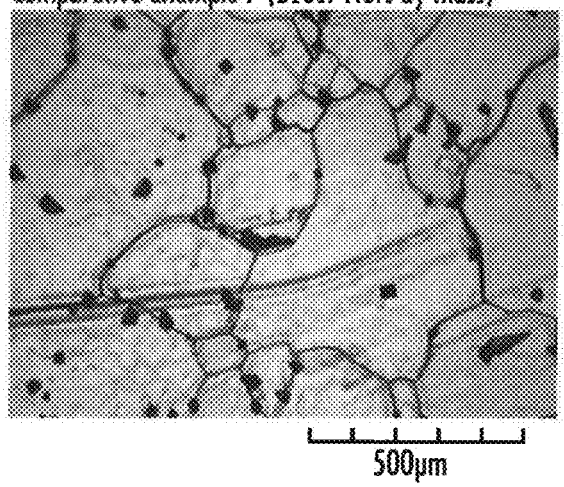
FIG. 17 is a laser microscope photograph showing the occurrence or nonoccurrence of the red crystals in the glass obtained from the glass composition for glass fiber of Comparative Example 7.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 17 and Table 5.

Comparative Example 8

In present Comparative Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 57.5% by mass, $Al_2O_3$ in a content of 22.0% by mass, MgO in a content of 11.8% by mass, CaO in a content of 7.5% by mass, $B_2O_3$ in a content of 1.0% by mass, and $Na_2O$, $K_2O$ and $Fe_2O_3$ as the other components in a content of 0.2% by mass. In the glass composition for glass fiber of present Comparative Example, the total content of $SiO_2$, $Al_2O_3$, MgO and CaO is 98.8% by mass. The composition of the glass composition for glass fiber of present Comparative Example is shown in Table 5.

Figure 18:
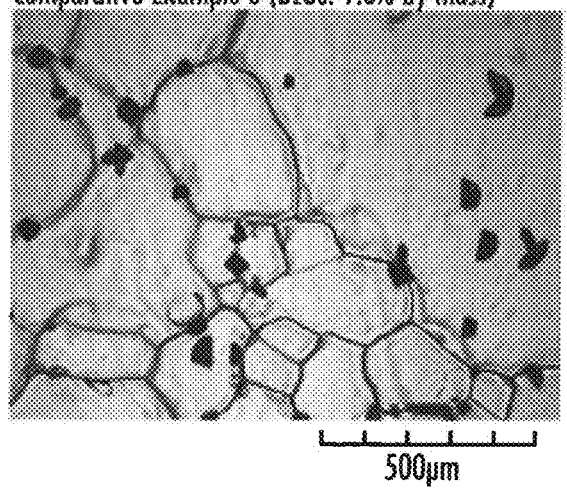
FIG. 18 is a laser microscope photograph showing the occurrence or nonoccurrence of the red crystals in the glass obtained from the glass composition for glass fiber of Comparative Example 8.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 18 and Table 5.

TABLE 5

|  | Comparative Example 6 | Comparative Example 7 | Comparative Example 8 |
|---|---|---|---|
| $SiO_2$ (% by mass) | 57.0 | 59.0 | 57.5 |
| $Al_2O_3$ (% by mass) | 22.0 | 20.0 | 22.0 |
| MgO (% by mass) | 9.8 | 12.0 | 11.8 |
| CaO (% by mass) | 10.0 | 7.8 | 7.5 |
| $B_2O_3$ (% by mass) | 1.0 | 1.0 | 1.0 |
| Others (% by mass) | 0.2 | 0.2 | 0.2 |
| $CaO/Al_2O_3$ | 0.45 | 0.39 | 0.34 |
| $(B_2O_3 \times CaO)/Al_2O_3$ | 0.45 | 0.39 | 0.34 |
| Occurrence/nonoccurrence of red crystals | Observed | Observed | Observed |

In the table, "$CaO/Al_2O_3$" represents "CaO (% by mass)/$Al_2O_3$ (% by mass)." "$(B_2O_3 \times CaO)/Al_2O_3$" represents "($B_2O_3$ (% by mass) × CaO (% by mass))/$Al_2O_3$ (% by mass)."

As is obvious from FIGS. 16 to 18 and Table 5, it is impossible to prevent the precipitation of the red crystals, even when the content of $B_2O_3$ in relation to the total amount of the glass composition for glass fiber falls within a range from 0.5 to 1.5% by mass, in the case of Comparative Example 6 in which the content of $Al_2O_3$ in relation to the total amount of the glass composition for glass fiber exceeds 20.0% by mass, in the case of Comparative Example 7 in which the content of CaO in relation to the total amount of the glass composition for glass fiber is less than 10.0% by mass, and in the case of Comparative Example 8 in which the content of $Al_2O_3$ in relation to the total amount of the glass composition for glass fiber exceeds 20.0% by mass and the content of CaO in relation to the total amount of the glass composition for glass fiber is less than 10.0% by mass.

Comparative Example 9

In present Comparative Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 59.8% by mass, $Al_2O_3$ in a content of 16.0% by mass, MgO in a content of 10.5% by mass, CaO in a content of 12.5% by mass, $B_2O_3$ in a content of 1.0% by mass, and $Na_2O$, $K_2O$ and $Fe_2O_3$ as the other components in a content of 0.2% by mass. In the glass composition for glass fiber of present Comparative Example, the total content of $SiO_2$, $Al_2O_3$, MgO and CaO is 98.8% by mass. The composition of the glass composition for glass fiber of present Comparative Example is shown in Table 6.

Next, glass cullet was prepared in exactly the same manner as in Example 1 except that the glass batch of present Comparative Example was used, and the 1000-poise temperature, the liquidus temperature and the working temperature range of the glass composition for glass fiber of present Comparative Example were measured. Glass fibers were spun in exactly the same manner as in Example 1 except that the glass cullet was used, and the fiber strength and the fiber modulus of elasticity of the glass fibers (monofilaments) obtained in present Comparative Example were measured in exactly the same manner as in Example 1. The results thus obtained are shown in Table 6.

Figure 19:
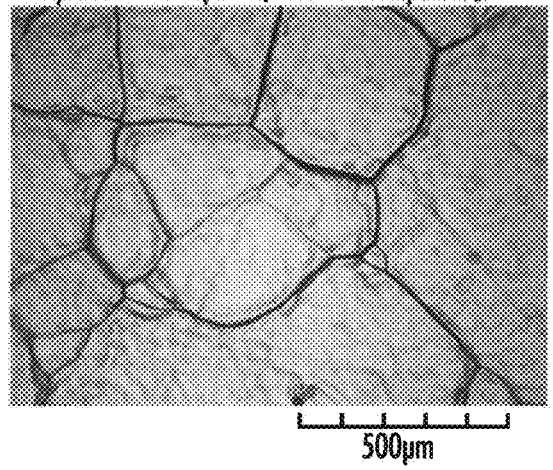
FIG. 19 is a laser microscope photograph showing the occurrence or nonoccurrence of the red crystals in the glass obtained from the glass composition for glass fiber of Comparative Example 9.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 19 and Table 6.

Comparative Example 10

In present Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 58.3% by mass, $Al_2O_3$ in a content of 18.0% by mass, MgO in a content of 9.0% by mass, CaO in a content of 13.5% by mass, $B_2O_3$ in a content of 1.0% by mass, and $Na_2O$, $K_2O$ and $Fe_2O_3$ as the other components in a content of 0.2% by mass. In the glass composition for glass fiber of present Comparative Example, the total content of $SiO_2$, $Al_2O_3$, MgO and CaO is 98.8% by mass. The composition of the glass composition for glass fiber of present Comparative Example is shown in Table 6.

Next, glass cullet was prepared in exactly the same manner as in Example 1 except that the glass batch of present Comparative Example was used, and the 1000-poise temperature, the liquidus temperature and the working temperature range of the glass composition for glass fiber of present Comparative Example were measured. Glass fibers were spun in exactly the same manner as in Example 1 except that the glass cullet was used, and the fiber strength and the fiber modulus of elasticity of the glass fibers (monofilaments) obtained in present Comparative Example were measured in exactly the same manner as in Example 1. The results thus obtained are shown in Table 6.

Figure 20:
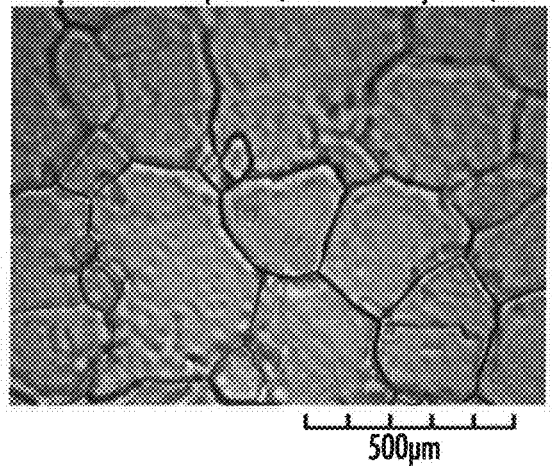
FIG. 20 is a laser microscope photograph showing the occurrence or nonoccurrence of the red crystals in the glass obtained from the glass composition for glass fiber of Comparative Example 10.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 20 and Table 6.

Comparative Example 11

In present Comparative Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 59.8% by mass, $Al_2O_3$ in a content of 20.0% by mass, MgO in a content of 8.0% by mass, CaO in a content of 11.0% by mass, $B_2O_3$ in a content of 1.0% by mass, and $Na_2O$, $K_2O$ and $Fe_2O_3$ as the other components in a content of 0.2% by mass. In the glass composition for glass fiber of present Comparative Example, the total content of $SiO_2$, $Al_2O_3$, MgO and CaO is 98.8% by mass. The composition of the glass composition for glass fiber of present Comparative Example is shown in Table 6.

Next, glass cullet was prepared in exactly the same manner as in Example 1 except that the glass batch of present Comparative Example was used, and the 1000-poise temperature, the liquidus temperature and the working temperature range of the glass composition for glass fiber of present Comparative Example were measured. Glass fibers were spun in exactly the same manner as in Example 1 except that the glass cullet was used, and the fiber strength and the fiber modulus of elasticity of the glass fibers (monofilaments) obtained in present Comparative Example were measured in exactly the same manner as in Example 1. The results thus obtained are shown in Table 6.

Figure 21:
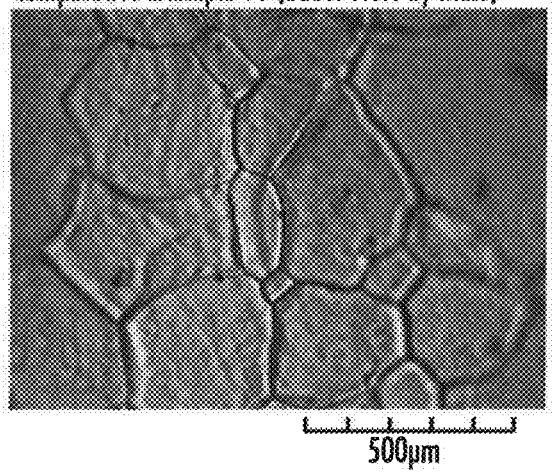
FIG. 21 is a laser microscope photograph showing the occurrence or nonoccurrence of the red crystals in the glass obtained from the glass composition for glass fiber of Comparative Example 11.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 21 and Table 6.

Comparative Example 12

In present Comparative Example, first, there was obtained a glass batch prepared by mixing the respective glass raw materials so as to give, when the resulting mixture was melted, a melt of a glass composition for glass fiber (molten glass) including, in relation to the total amount thereof, $SiO_2$ in a content of 57.0% by mass, $Al_2O_3$ in a content of 18.0% by mass, MgO in a content of 13.0% by mass, CaO in a content of 10.8% by mass, $B_2O_3$ in a content of 1.0% by mass, and $Na_2O$, $K_2O$ and $Fe_2O_3$ as the other components in a content of 0.2% by mass. In the glass composition for glass fiber of present Comparative Example, the total content of $SiO_2$, $Al_2O_3$, MgO and CaO is 98.8% by mass. The composition of the glass composition for glass fiber of present Comparative Example is shown in Table 6.

Next, glass cullet was prepared in exactly the same manner as in Example 1 except that the glass batch of present Comparative Example was used, and the 1000-poise temperature, the liquidus temperature and the working temperature range of the glass composition for glass fiber of present Comparative Example were measured. Glass fibers were spun in exactly the same manner as in Example 1 except that the glass cullet was used; in present Comparative Example, the content of MgO exceeded 12.0% by mass, and accordingly, the 1000-poise temperature and the liquidus temperature were close to each other, and the working temperature range was narrowed. Consequently, in present Comparative Example, the spinning of glass fibers was not able to be stably performed, and the fiber strength and the fiber modulus of elasticity of the glass fibers (monofilaments) were not able to be measured. The results thus obtained are shown in Table 6.

Figure 22:
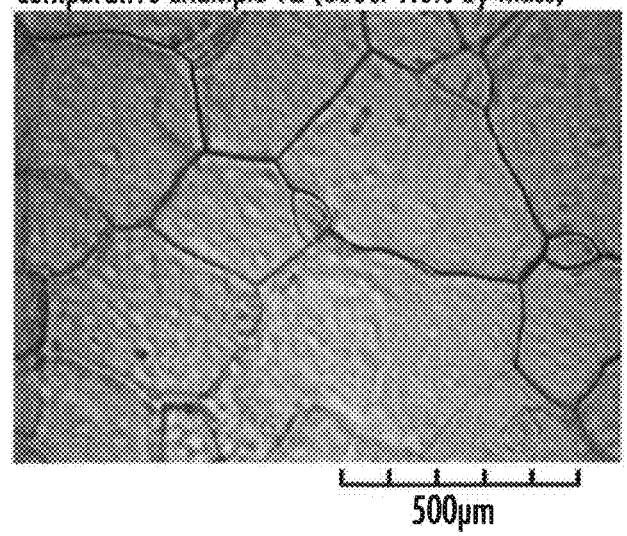
FIG. 22 is a laser microscope photograph showing the occurrence or nonoccurrence of the red crystals in the glass obtained from the glass composition for glass fiber of Comparative Example 12.

Next, a chromium oxide-containing glass batch was prepared in exactly the same manner as in Example 1 except that the glass batch obtained in present Comparative Example was used, and glass cullet was prepared in exactly the same manner as in Example 1 except that the chromium oxide-containing glass batch was used. Next, in exactly the same manner as in Example 1, the obtained glass cullet was placed in a platinum vessel with boat-like shape, melted in an electric furnace at 1550° C. for 2 hours, then decreased in temperature to 1250° C. and maintained at 1250° C. for 12 hours. Next, in exactly the same manner as in Example 1, the interface portion on the platinum surface with the glass was observed by using a laser microscope at a magnification of 200, and thus the occurrence or nonoccurrence of the red crystals was examined. The results thus obtained are shown in FIG. 22 and Table 6.

TABLE 6

| | Comparative Example 9 | Comparative Example 10 | Comparative Example 11 | Comparative Example 12 |
|---|---|---|---|---|
| $SiO_2$ (% by mass) | 59.8 | 58.3 | 59.8 | 57.0 |
| $Al_2O_3$ (% by mass) | 16.0 | 18.0 | 20.0 | 18.0 |
| MgO (% by mass) | 10.5 | 9.0 | 8.0 | 13.0 |
| CaO (% by mass) | 12.5 | 13.5 | 11.0 | 10.8 |
| $B_2O_3$ (% by mass) | 1.0 | 1.0 | 1.0 | 1.0 |
| Others (% by mass) | 0.2 | 0.2 | 0.2 | 0.2 |
| $CaO/Al_2O_3$ | 0.78 | 0.75 | 0.55 | 0.60 |
| $(B_2O_3 \times CaO)/Al_2O_3$ | 0.78 | 0.75 | 0.55 | 0.60 |
| 1000-Poise temperature (° C.) | 1314 | 1317 | 1365 | 1273 |
| Liquidus temperature (° C.) | 1226 | 1220 | 1253 | 1242 |
| Working temperature range (° C.) | 88 | 97 | 112 | 31 |
| Fiber strength (GPa) | 3.8 | 4.1 | 4.0 | — |
| Fiber modulus of elasticity (GPa) | 81 | 82 | 82 | — |
| Occurrence/ nonoccurrence of red crystals | Not observed | Not observed | Not observed | Not observed |

In the table, "$CaO/Al_2O_3$" represents "CaO (% by mass)/$Al_2O_3$ (% by mass)." "$(B_2O_3 \times CaO)/Al_2O_3$" represents "($B_2O_3$ (% by mass) × CaO (% by mass))/$Al_2O_3$ (% by mass)."

As is obvious from FIGS. 19 to 22 and Table 6, microparticles (red crystals) are not generated in the glass structure of the glass cullet, but it is impossible to obtain a sufficient fiber modulus of elasticity of 83 GPa or more, in the case of Comparative Example 9 in which the content of $Al_2O_3$ in relation to the total amount of the glass composition for glass fiber is less than 17.5% by mass, in the case of Comparative Example 10 in which the content of CaO in relation to the total amount of the glass composition for glass fiber exceeds 13.0% by mass, and in the case of Comparative Example 11 in which the content of MgO in relation to the total amount of the glass composition for glass fiber is less than 8.5% by mass, In addition, in the case of Comparative Example 12 in which the content of MgO exceeds 12.0% by mass, the 1000-poise temperature and the liquidus temperature are close to each other and the working temperature range is as narrow as lower than 50° C., and accordingly, it is difficult to stably perform the spinning of glass fibers, and this case is not suitable for the production of glass fibers.

The invention claimed is:

1. A glass composition for glass fiber comprising, in relation to the total amount thereof, $SiO_2$ in a range of 57.0 to 60.0% by mass, $Al_2O_3$ in a range of 17.5 to 20.0% by mass, MgO in a range of 8.5 to 12.0% by mass, CaO in a range of 10.0 to 13.0% by mass and $B_2O_3$ in a range of 0.5 to 1.5% by mass, the total content of $SiO_2$, $Al_2O_3$, MgO and CaO being 98.0% by mass or more.

2. The glass composition for glass fiber according to claim 1, comprising, in relation to the total amount thereof, $SiO_2$ in a range of 57.5 to 59.5% by mass, $Al_2O_3$ in a range of 18.0 to 19.5% by mass, MgO in a range of 8.8 to 11.5% by mass and CaO in a range of 10.3 to 12.5% by mass.

3. The glass composition for glass fiber according to claim 1, comprising, in relation to the total amount thereof, $SiO_2$ in a range of 58.0 to 59.3% by mass, $Al_2O_3$ in a range of 18.2 to 19.0% by mass, MgO in a range of 9.0 to 11.0% by mass and CaO in a range of 10.5 to 12.0% by mass.

4. The glass composition for glass fiber according to claim 1, comprising, in relation to the total amount thereof, $SiO_2$ in a range of 58.0 to 59.3% by mass, $Al_2O_3$ in a range of 18.2 to 19.0% by mass, MgO in a range of 9.0 to 11.0% by mass and CaO in a range of 10.5 to 11.9% by mass.

5. The glass composition for glass fiber according to claim 1, wherein the ratio (CaO (% by mass)/$Al_2O_3$ (% by mass)) of the content of CaO (% by mass) to the content of $Al_2O_3$ (% by mass) is in a range of 0.50 to 0.72, and the ratio (($B_2O_3$ (% by mass)×CaO (% by mass))/$Al_2O_3$ (% by mass)) of the product of the content of $B_2O_3$ (% by mass) and the content (% by mass) of CaO to the content (% by mass) of $Al_2O_3$ is in a range of 0.22 to 1.00.

6. The glass composition for glass fiber according to claim 1, wherein the glass fibers produced from the glass composition for glass fiber comprises $Cr_2O_3$ in a range of 0.001 to 0.010% by mass.

7. The glass composition for glass fiber according to claim 1, wherein the fiber modulus of elasticity of the glass fibers produced from the glass composition for glass fiber is 83 GPa or more.

8. The glass composition for glass fiber according to claim 1, wherein the linear expansion coefficient of the glass fibers produced from the glass composition for glass fiber in a temperature range of 50 to 200° C. is 4.2 ppm/K or less.

9. The glass composition for glass fiber according to claim 1, wherein the fiber strength of the glass fibers produced from the glass composition for glass fiber is 4.0 GPa or more.

10. Glass fibers formed from a glass composition for glass fiber comprising, in relation to the total amount thereof, $SiO_2$ in a range of 57.0 to 60.0% by mass, $Al_2O_3$ in a range of 17.5 to 20.0% by mass, MgO in a range of 8.5 to 12.0% by mass, CaO in a range of 10.0 to 13.0% by mass and $B_2O_3$ in a range of 0.5 to 1.5% by mass, the total content of $SiO_2$, $Al_2O_3$, MgO and CaO being 98.0% by mass or more,
    wherein the glass fibers have non-circular cross sections each having the ratio (major axis/minor axis) of the major axis to the minor axis of the cross sectional shape in a range of 2.0 to 6.0 and the fiber diameter defined as the diameter of the perfect circle having the same area as the actual cross-sectional area of the fiber in a range of 10 to 30 μm.

11. Glass fibers formed from a glass composition for glass fiber comprising, in relation to the total amount thereof, $SiO_2$ in a range of 57.0 to 60.0% by mass, $Al_2O_3$ in a range of 17.5 to 20.0% by mass, MgO in a range of 8.5 to 12.0% by mass, CaO in a range of 10.0 to 13.0% by mass and $B_2O_3$ in a range of 0.5 to 1.5% by mass, the total content of $SiO_2$, $Al_2O_3$, MgO and CaO being 98.0% by mass or more, wherein the glass fibers have perfect circular cross sections and fiber diameters in a range of 3 μm or more and less than 10 μm.

\* \* \* \* \*